Sept. 7, 1937. E. A. JOHNSON Re. 20,497

PRESSURE HEAD FOR OIL WELLS

Original Filed June 13, 1930

Edwin A. Johnson INVENTOR.

BY Jesse R. Stone
Lester B. Clark
ATTORNEYS

Reissued Sept. 7, 1937 Re. 20,497

UNITED STATES PATENT OFFICE 20,497

PRESSURE HEAD FOR OIL WELLS

Edwin A. Johnson, Houston, Tex., assignor, by mesne assignments, to Hinderliter Tool Company, Tulsa, Okla., a corporation of Oklahoma Original No. 2,001,684, dated May 14, 1935, Serial No. 460,855, June 13, 1930. Renewed August 5, 1931. Application for reissue May 13, 1937, Serial No. 142,404

39 Claims. (Cl. 166—14)

My invention relates to an attachment for casing heads employed in oil well operations.

The object of the invention is to provide a means to seal the space inside the casing head and between the same and a pipe concentric therewith, such as the drill stem employed in drilling or the tubing employed in pumping operations.

In the handling of oil wells, either in drilling or pumping, where gas pressures are present in the well, provision must be made for preventing the gas from blowing out of the casing and wasting the oil or gas and damaging the apparatus.

An object of my invention is to provide a particular construction of pressure head to be placed within the casing head and to form an effective seal under high pressure. I desire so to form the sealing device that it will be rendered effective through the pressure of the fluid in the well.

I also desire so to form the sealing device that the weight of the pipe within the casing may be employed in compressing the packing more effectively.

I also have as an object so to construct my pressure head that pipe may be introduced into the well but its removal from the well under pressure will be prevented.

This invention is an improvement upon the structure shown in my copending application for patent, Serial No. 432,050, filed February 28, 1930.

Referring to the drawing herewith,

Figures 1, 2, 3:
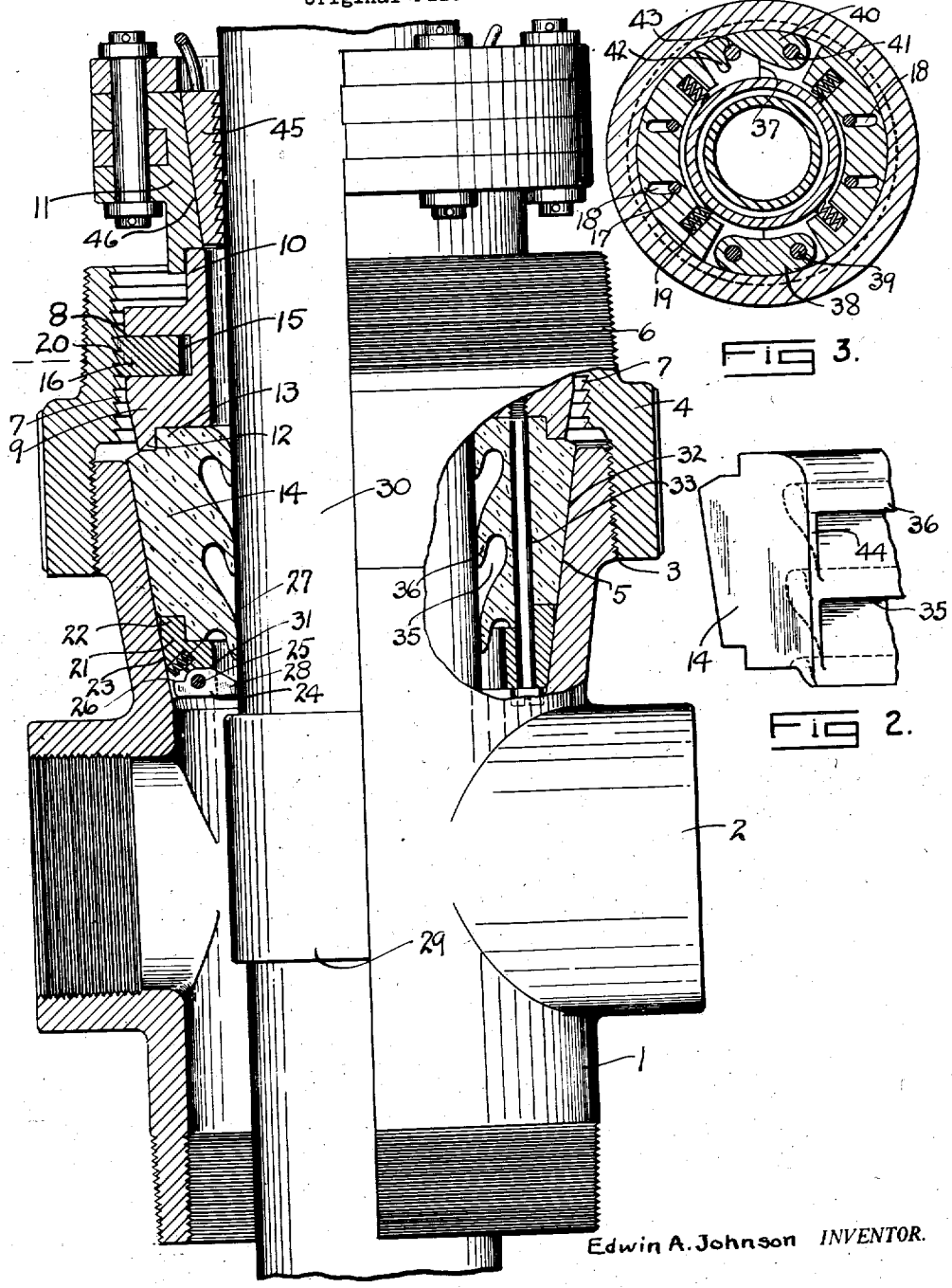
Figure 1 is a side view partly in elevation and partly in section illustrating a casing head equipped with my invention.
Figure 2 is a perspective detail illustrating the packing member employed with my device.
Figure 3 is a transverse section on the plane 3—3 of Figure 1.

I have shown my device as employed upon a casing head 1 having the usual lateral outlets 2. The upper end of the casing head is threaded externally at 3 for attachment to a clamping ring 4. The interior of the upper end may be provided with a downwardly tapered seat 5 to receive the pressure head.

The clamping ring 4 has its upper end reduced somewhat in diameter and threaded at 6 for attachment to any extension which may be desired thereon. The interior face of the clamping ring is toothed at 7 with downwardly inclined ratchet teeth to cooperate with the latching dogs 8 upon the pressure head.

The pressure head is made up of an upper plate or ring 9, which is preferably of steel, a packing member, and a lower plate or ring. Its upper end is provided with an upwardly extending flange 10 to form a support for the bushing or slip bowl 11. The lower side of the ring is slightly tapered and is formed with a downwardly extending flange 12 adjacent the outer margin to engage over the upper end 13 of the packing member 14. The ring 9 has on its outer face a radial recess 15 in which the latching dogs 16 are housed. As will be seen from Figure 3, said latching dogs are arcuate in shape and are held within the recesses 15 by pins 17. Said pins fit within radial slots 18 in the dogs, allowing said dogs a limited radial movement, as will be clear from the drawing. Springs 19 housed within the inner sides of the dogs and bearing against the inner wall of the recesses tend to hold said latching dogs resiliently outwardly. The outer faces of the dogs are formed with teeth 20 adapted to engage within the teeth 7 of the clamping ring.

The lower ring 21 is of smaller diameter, its upper end being cylindrical and flanged at 22 to engage about the lower end of the packing member 14. Adjacent the lower end it is tapered at 23 to engage the seat 5.

Provided on the lower ring 21 are a series of dogs 24 pivoted upon horizontally extending pins 25 in the ring and adapted to have a limited rotative movement thereon. The outer end of each dog has an upper shoulder 26, which may contact with a spring 27, which tends to limit the upward movement of the shoulder 26 and to move the dog into horizontal position. The inner end 28 of the dog has a lower shoulder which is engaged by the collars 29 upon the pipe 30 and limits the upward movement of the pipe. The upper side of the dog contacts with a shoulder 31, which limits its upward movement to the horizontal position shown in Figure 1.

The lower ring and the upper ring are adapted to clamp between them the packing member 14 which may be of rubber or any similar compressible material forming the sealing member of my pressure head. This packing member or gasket 14 may be tapered downwardly at 32 on its outer face to fit the seat 5. Bolts or pins 33 extending through the lower ring and upwardly through the gasket are screwed within the upper ring 9, thus holding the ring against the gasket at each end, and it will be observed that the lower ring may move slidably upward along the bolts 33 when pressure is exerted thereon. The positioning of these bolts 33 may be reversed if desired.

The packing gasket 14 is formed on its inner face with undercut recesses 35. I have shown three such recesses, the object of which is to provide downwardly directed lips 36, which may be compressed against the pipe 30 and form a seal therewith. The lips thus formed tend to be compressed against the pipe by the escape of pressure fluid from below into the pockets or recesses 35 on the inner face of the gasket.

The pressure head including the upper and lower ring with the gasket between them are longitudinally divided so as to be quickly engaged about the pipe 30 when desired. With attention to Figure 3, it will be seen that the pressure head is divided along the line 37. On one side of the bushing is a hinge member 38 which is made up of a link pivotally connected at 39 to each of the halves of the pressure head. On the opposite side of the pressure head is a latch 40, which is pivoted at 41 to one half and has a catch 42 engaging about a pin 43 on the adjacent half of the bushing. It will be obvious that my device may be swung open and latched quickly about the pipe and moved downwardly into the tapered seat 5, the latching dogs 16 automatically engaging in the clamping ring to prevent removal of the device.

The rubber gasket 14 is formed in two halves to allow for the longitudinal splitting of the bushing. As will be seen from Figure 2, a wall 44 is provided adjacent the line of division to prevent escape of the pressure fluid along this division line. It should be noted that the rings 9 and 21 have openings therein of sufficient diameter to pass a coupling or tool joint such as 29 is desired, so that the drill pipe or tubing may be run into the well while the packing element is in place and under pressure.

I may provide in connection with my pressure head an adapted ring or slip bowl 11 above the pressure head to support pipe engaging jaws or slips 45 and thus allow the weight of the pipe to be supported upon the pressure head, thus exerting a downward pressure on the pressure head and tend thereby to compress the same and assure a tight seal about the pipe. This adapter 11 is a hinged ring adapted to latch about the pipe and has an inwardly tapered seat 46 to receive the jaws 45. The lower end of the ring is supported as previously noted upon the flange 10 of the upper ring.

The advantages of my device lie in the fact that the device may be inserted in position for use quickly and latched in sealing engagement with little difficulty or delay. The device is adapted to seal more effectively through pressure on either the upper or lower plate, and where pressure fluid from below tends to escape past the device, it compresses the lips 36 more firmly against the pipe and prevents escape of fluid.

The further objects and advantages of the device will be obvious to those skilled in the art.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A pressure head for wells including a well casing, a casing head thereon having a downwardly tapered seat, a packing member therein adapted to fit said seat and seal about an inner pipe, said member including upper and lower rings having openings sufficiently large to permit the passage of a pipe coupling, a rubber gasket between said rings, said gasket having annular undercut recesses on its inner surface to provide downwardly curved lips to engage said pipe, and means to secure said rings to said gasket.

2. A pressure head for wells including a well casing, a casing head thereon having a seat, a packing member therein adapted to fit said seat and seal about an inner pipe, said member including upper and lower rings, each of said rings having an opening of sufficient size to permit the passage of a pipe coupling, a rubber gasket between said rings, said gasket having annular undercut recesses on its inner surface to provide downwardly curved lips to engage said pipe, means to secure said rings to said gasket, and means to hold said packing member in said seat.

3. A pressure head for wells including a well casing, a casing head thereon having a seat, a packing member therein adapted to fit said seat and seal about an inner pipe, said member including upper and lower rings of sufficient diameter to permit the passage of a pipe coupling therethrough, a rubber gasket between said rings, said gasket having annular undercut recesses on its inner surface to provide downwardly curved lips to engage said pipe, and means to secure said rings to said gasket, said rings and gasket being split longitudinally and hinged together in the manner stated.

4. A pressure head for wells including a well casing, a casing head thereon having a downwardly tapered seat, a packing member therein adapted to fit said seat and seal about an inner pipe, said member including upper and lower rings having openings sufficiently large to permit the passage of a pipe coupling, a rubber gasket between said rings, said gasket having annular undercut recesses on its inner surface to provide downwardly curved lips to engage said pipe, means to secure said rings to said gasket, and means supported on said member to support said pipe.

5. A device to close the space between a well casing and an inner concentric pipe including a casing head having a seat, a clamping ring on said casing head, a packing member comprising upper and lower rings having inner openings of sufficient size to accommodate pipe couplings, a packing gasket between said rings, said gasket and lower ring being shaped to fit said seat, and downwardly extending lips on the inner surface of said gasket to engage said pipe and form a seal therewith.

6. A device to close the space between a well casing and an inner concentric pipe including a casing head having a downwardly tapered seat, a clamping ring on said casing head, a packing member comprising upper and lower rings sufficiently large to permit the passage of a pipe coupling therethrough, a packing gasket between said rings, said gasket and lower ring being shaped to fit said seat, and downwardly extending lips on the inner surface of said gasket to engage said pipe and form a seal therewith and means supported on said packing member to engage and support said pipe, the weight of the pipe thereby forcing said packing member into said seat and to move it inwardly against the pipe to compress said lips.

7. A device to close the space between a well casing and an inner concentric pipe including a casing head having a downwardly tapered seat, a clamping ring on said casing head, a packing member comprising upper and lower rings each sufficiently large to permit the passage of a pipe coupling therethrough, a packing gasket between said rings, said gasket and lower ring being shaped to fit said seat, downwardly extending lips on said gasket to engage said pipe, said lips having fluid receiving chambers below them to aid them to form a seal with said pipe, means supported on said packing member to engage and support said pipe, the weight of the pipe thereby forcing said packing member into said seat, and means on said member engaging said clamping ring to hold said member from upward movement in said seat.

8. A device to close the space between a well casing and an inner concentric pipe including a casing head having a seat, a clamping ring on said casing head, a packing member comprising upper and lower rings each sufficiently large to permit the passage of a pipe coupling therethrough, a packing gasket between said rings, said gasket and lower ring being shaped to fit said seat, downwardly extending lips on the interior face of said gasket to engage said pipe and to be compressed by the fluid pressure and form a seal therewith, and means to prevent upward movement of pipe couplings through said member.

9. A device of the character described including a well casing, a casing head thereon having a downwardly tapered seat thereon, an inner concentric pipe, a packing member including upper and lower rings, a packing gasket between said rings shaped to engage said seat, and a dog on said lower ring pivoted to allow downward movement of pipe couplings therethrough but to prevent the upward movement of said couplings.

10. A device of the character described including a well casing, a casing head thereon having a seat thereon, an inner concentric pipe, a packing member including upper and lower rings, a packing gasket between said rings shaped to engage said seat, means on said upper ring to latch said member in said seat, and a dog on said lower ring pivoted to allow downward movement of pipe couplings therethrough but to prevent the upward movement of said couplings.

11. A device of the character described including a well casing, a casing head thereon having a downwardly tapered seat thereon, an inner concentric pipe, a packing member including upper and lower rings, a packing gasket between said rings shaped to engage said seat, downwardly extending lips on said gasket to engage said pipe, and a dog on said lower ring pivoted to allow downward movement of pipe couplings therethrough but to prevent the upward movement of said couplings.

12. A casing head having a removable unit adapted to seal about a pipe passing therethrough, said unit including a packing element, flexible means thereon to seal about the pipe, said flexible unit being of such diameter that a coupling may pass therethrough, a downwardly directed lip on said flexible means to form a seal and means on said unit to apply the weight of the string of pipe to compress the packing element.

13. A casing head adapted to seal about a pipe passing therethrough including a packing element adapted to pass a pipe coupling, flexible means thereon to seal about the pipe, means to apply the weight of the string of pipe to compress the packing element, and additional means to stop the upward movement of a collar on the inner pipe when it reaches said element.

14. In combination with a casing head, a sealing unit adapted to be dropped into position in said casing head, automatic latch means to catch said unit and hold it in said casing head, and a slip bowl adapted to be passed around a pipe in the casing head and to thereafter seat on said sealing unit.

15. In combination with a casing head, a sealing unit adapted to be dropped into position in said casing head, automatic latch means to catch said unit and hold it in said casing head, and a slip bowl adapted to be passed around a pipe in the casing head and to thereafter seat on said sealing unit, whereby slips may be positioned in said bowl and support the pipe in the casing.

16. In combination with a casing head, a sealing unit adapted to be dropped into position in said casing head, automatic latch means to catch said unit and hold it in said casing head, and a slip bowl adapted to be passed around a pipe in the casing head and thereafter to seat on said sealing unit whereby slips may be positioned in said bowl and support the pipe in the casing, and thus apply the weight of the pipe to said sealing unit.

17. A casing head adapted to seal about a pipe passing therethrough including a tapered seat, a packing element, flexible sealing means thereon, a downwardly directed lip on the inner face of said means to engage and seal about the pipe, said element being of sufficient size and said lip being sufficiently displaceable to permit the passage therethrough of a pipe coupling, means to engage said pipe and support the weight of said pipe to compress said packing element by the weight of the pipe, and means to hold said packing to withstand a predetermined pressure.

18. In a casing head, a vertically disposed extension thereon for surrounding a pipe passing therethrough, supporting means in said extension, a packing assembly on said supporting means, said packing assembly comprising an annular resilient packing element disposed for engagement with the pipe and including a depending skirt portion on its inner edge, and means for urging downwardly on said packing assembly to depress the same and form a high pressure seal between the pipe and said extension.

19. In a casing head, a vertically disposed extension thereon for surrounding a pipe passing therethrough, supporting means in said extension, a packing assembly on said supporting means, said packing assembly comprising an annular packing element disposed to surround the pipe, and including a flexible depending flange on the inner edge for engagement with the pipe, and means for urging downwardly on said packing assembly to depress the same and form a high pressure seal between the pipe and said extension.

20. In a casing head, a vertically disposed extension thereon for surrounding a pipe passing therethrough, supporting means in said extension, a packing assembly on said supporting means, said packing assembly comprising an annular packing element disposed to surround the pipe, said element having a groove in its lower edge providing an annular pocket spaced from the inner edge, and a depending flange on the inner edge of said packing element to increase the pressure resistance of the packing, and means for urging downwardly on said packing assembly to depress the same and form a high pressure seal between the pipe and said extension.

21. In a casing head, a vertically disposed extension thereon for surrounding a pipe passing therethrough, supporting means in said extension, a packing assembly on said supporting means, said packing assembly comprising a packing element with its outer edge engaging the inner surface of said extension, said extension having its inner surface tapered upwardly and outwardly away from said packing element, and means for urging downwardly on said packing element to depress the same and to form a high pressure seal between the pipe and said extension.

22. In a casing head, a vertically disposed extension thereon for surrounding a pipe passing therethrough, supporting means on said extension, a packing assembly on said supporting means, and means supported by said packing assembly adapted to hold the weight of the pipe for compressing the packing and forming a high pressure seal, said packing assembly comprising an annular resilient packing element disposed for engagement with the pipe and including a depending skirt portion on its lower edge.

23. In a casing head, a vertically disposed extension thereon for surrounding a pipe passing therethrough, supporting means on said extension, a packing assembly on said supporting means, and means supported by said packing assembly adapted to hold the weight of the pipe for compressing the packing and forming a high pressure seal, said packing assembly comprising an annular packing element disposed to surround the pipe, and including a flexible depending flange on the inner edge for engagement with the pipe.

24. In a casing head, sealing means for disposition around pipe extending through said casing head and comprising a ring having its internal surface radially urged into engagement with said pipe and formed hollow to yield internally and radially from and toward the pipe as the pipe and its couplings are passed through the casing head so as to maintain continuously a fluidtight seal about the pipe, and means for exerting a downward pressure on said sealing means to force it into effective sealing position.

25. In a casing head, a blowout preventer comprising an annular packer sleeve for disposition around and in sealing engagement with pipe extending through the head and having upper and lower edges spaced from the pipe and held in relatively fixed positions, said sleeve having an annular inner projection for sealing contact with the pipe and which projection is offset downwardly relative to said edges so as to provide an annular downwardly depending skirt for enhancing the sealing effect of said packer sleeve, whereby a fluidtight seal is continuously maintained about the pipe.

26. In a casing head, a blowout preventer comprising an annular packer sleeve for disposition around and in sealing engagement with the pipe extending through the head and having upper and lower spaced packer sleeve retaining rings which have opposite annular pockets for receiving and holding said upper and lower edges of the sleeve in relatively fixed positions, said sleeve having an inner and downwardly projecting annular portion for contacting said pipe and which portion is offset downwardly relative to said edges of said ring for enhancing the sealing effect of the packer sleeve when in use.

27. In a casing head, sealing means comprising an annular packing sleeve for disposition around and in sealing engagement with pipe extending through the head and having upper and lower spaced annular flanges and an intermediate annular extension projecting from between said flanges and offset downwardly for contact with the pipe, and means, one of which is adjustable, for accommodating and holding said annular flanges in properly spaced position in the casing head.

28. In a casing head, a sealing means comprising a packer ring for disposition around pipe extending through said head and having an inner unbroken cylindrical surface radially urged into engagement with said pipe and formed to yield radially from and toward the pipe as the pipe and its couplings are passed through the casing head into effective sealing position to maintain continuously a fluidtight seal about the pipe, and means for subjecting the ring to endwise compressive force for deflecting the ring laterally into said effective sealing position.

29. In a casing head, a sealing means comprising a packer ring for disposition around pipe extending through said head and having an inner unbroken cylindrical surface radially urged into engagement with said pipe and formed to yield radially from and toward the pipe as the pipe and its couplings are passed through the casing head into effective sealing position to maintain continuously a fluidtight seal about the pipe, an adapter ring in said head above said sealing means formed to accommodate slips for anchoring the pipe to said head, and means for subjecting the packer ring to an endwise compressive force to deflect the ring laterally into said effective sealing position.

30. In a casing head structure, a flexible packing element arranged to effect a seal about a pipe passing therethrough and being of sufficient size to permit the passage therethrough of a pipe coupling, a downwardly directed lip on said element to engage the pipe, and supporting means for a string of pipe arranged to transfer a substantial part of the weight of such a string of pipe onto said element to distort the element laterally into engagement with the pipe.

31. In a casing head structure, a flexible packer element for effecting a seal about a pipe extending therethrough, means providing a seat for said element, said element being so formed as to be displaceable sufficiently to permit the passage of a pipe coupling therethrough, and supporting means for a string of pipe arranged to transfer a substantial part of the weight of such a string of pipe onto said element to distort the element into sealing engagement with the pipe.

32. In a casing head structure, a hinged packer unit, latch means to hold said unit about a pipe extending therethrough, said unit being of sufficient diameter to permit the passage of a pipe coupling therethrough, a flexible packer element included in said unit and formed to provide sufficient distortion to permit the passage therethrough of a pipe coupling with said latch means closed, and supporting means arranged to hold a string of pipe and transfer a substantial part of the weight of the pipe string onto said element to distort the same into sealing engagement with the pipe.

33. In a casing head structure, a flexible packer element for effecting a seal about a pipe extending therethrough, means providing a seat for said element, said element being so formed as to be displaceable sufficiently to permit the passage of a pipe coupling therethrough, supporting means for a string of pipe arranged to transfer a substantial part of the weight of such a string of pipe onto said element to distort the element into sealing engagement with the pipe, and relatively rigid reinforcing means in said element disposed so as not to interfere with sufficient distortion of said element to permit the passage of a pipe coupling.

34. In a well pipe head, sealing means for disposition around pipe extending through said well pipe head and comprising a ring having its internal surface radially urged into engagement with said pipe and formed hollow to yield internally and radially from and toward the pipe so as to maintain continuously a fluidtight seal about the pipe, and means for exerting an endwise pressure on said sealing means to force it into effective sealing position and spaced from said pipe to allow exterior pipe couplings to pass through said means.

35. In a well pipe head, sealing means for disposition around pipe extending through said well pipe head and comprising a ring having its internal surface radially urged into engagement with said pipe and formed hollow to yield internally and radially from and toward the pipe so as to maintain continuously a fluidtight seal about the pipe, and means for exerting an endwise pressure on said sealing means to force it into effective sealing position and spaced from said pipe to allow exterior pipe couplings to pass through said means, said ring having a pressure responsive depending lip for sealing engagement with pipe extending therethrough.

36. In a well pipe head, a seat for sealing means, sealing means on said seat for disposition around pipe extending through said well pipe head and comprising a ring having its internal surface radially urged into engagement with said pipe and formed hollow to yield internally and radially from and toward the pipe so as to maintain continuously a fluidtight seal about the pipe, and means for exerting an endwise pressure on said sealing means to force it into effective sealing position, said sealing means including a vertically extending bolt-like element having one end anchored to said ring and having its other end secured to a member associated with an end of the ring, so that said ring is tied to said member, said ring including an outer annular substantially solid portion confined tightly in position by said bolt element for sealing engagement with said seat.

37. In a pipe head for wells, a resilient packing of annular formation having a central pipe-engaging surface deflectable to permit pipe couplings to pass therethrough while still maintaining a seal about the pipe, a rigid member asociated with one end of the packing, and a fastening element having a shank projecting out of and fastened to said packing for tying said packing to said member, said packing including a depending lip responsive to fluid pressure for aiding in maintaining a seal about the pipe extending through the packing.

38. In a pipe head for wells, a packing seat, a rubber packing of annular configuration disposed inside said seat and having a central pipe-engaging surface deflectable about and into sealing engagement with the surface of pipe extending therethrough, bolt means projecting from said packing, and a member to which said packing is secured by said bolt means, said packing including a depending pressure responsive lip for engagement with the pipe extending therethrough and an exterior solid portion held tightly against said seat by said bolt means, said member being formed to be spaced from the pipe to allow pipe couplings to pass therethrough, and said depending lip extending into the space between the pipe and said member.

39. In a pipe head for wells, a packing seat, a rubber packing of annular configuration disposed inside said seat and having a central pipe-engaging portion formed hollow to yield radially as the pipe and its couplings are passed therethrough, bolt means projecting from said packing, and a member to which said packing is secured by said bolt means, said packing including a depending pressure responsive lip for engagement with the pipe extending therethrough, and an exterior solid portion held tightly against said seat by said bolt means.

EDWIN A. JOHNSON.